(12) United States Patent
Uwano

(10) Patent No.: US 12,287,798 B2
(45) Date of Patent: Apr. 29, 2025

(54) ANALYSIS DEVICE

(71) Applicant: FANUC CORPORATION, Yamanashi (JP)

(72) Inventor: Tomofumi Uwano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/572,185

(22) PCT Filed: Jul. 9, 2021

(86) PCT No.: PCT/JP2021/025957
§ 371 (c)(1),
(2) Date: Dec. 20, 2023

(87) PCT Pub. No.: WO2023/281732
PCT Pub. Date: Jan. 12, 2023

(65) Prior Publication Data
US 2024/0289340 A1 Aug. 29, 2024

(51) Int. Cl.
*G06F 16/20* (2019.01)
*G06F 16/22* (2019.01)
*G06F 16/2457* (2019.01)

(52) U.S. Cl.
CPC .... *G06F 16/24578* (2019.01); *G06F 16/2246* (2019.01)

(58) Field of Classification Search
None
See application file for complete search history.

(56) References Cited

U.S. PATENT DOCUMENTS

| | | |
|---|---|---|
| 2013/0204827 A1 | 8/2013 | Kawachi et al. |
| 2018/0203439 A1* | 7/2018 | Hattori ............... G06F 17/18 |
| 2019/0012553 A1 | 1/2019 | Maruchi et al. |
| 2023/0297849 A1* | 9/2023 | Cheng ................. G06N 5/01 |
| | | 706/45 |

FOREIGN PATENT DOCUMENTS

| | | |
|---|---|---|
| JP | 2012-089057 A | 5/2012 |
| JP | 2017-167979 A | 9/2017 |
| JP | 2018-116545 A | 7/2018 |
| JP | 2019-016209 A | 1/2019 |
| JP | 2019-036186 A | 3/2019 |
| WO | 2012029154 A1 | 3/2012 |

* cited by examiner

*Primary Examiner* — Belix M Ortiz Ditren
(74) *Attorney, Agent, or Firm* — HAUPTMAN HAM, LLP

(57) ABSTRACT

An analysis device according to the present disclosure is provided with: a data acquisition unit that acquires data detected by an industrial machine; an operation state extraction unit that extracts, from the data, data detected during operation of the industrial machine; an annotation unit that creates a plurality of data set groups by giving, on the basis of a predetermined standard, annotations indicating motion states of the industrial machine to a plurality of data sets segmented by a predetermined standard from the extracted data during the operation; a feature amount extraction unit that extracts a feature amount of data included in each of the data sets; a learning unit that generates decision tree models respectively for the plurality of data set groups; and a display unit that ranks the generated decision tree models on the basis of correct answer rates regarding prediction of the annotations based on predetermined training data and that displays the decision tree models.

6 Claims, 4 Drawing Sheets

| RANK | MODEL | HOW TO CUT OUT DATA SET | CORRECTNESS RATE |
|---|---|---|---|
| 1 | MODEL A | ANNOTATION BEFORE THE OCCURRENCE OF A CONDITION IS GIVEN FOR EACH NUMBER OF OPERATIONS, UP TO 3 TIMES OF OPERATIONS BEFORE THE CONDITION OCCURS | 87% |
| 2 | MODEL B | ANNOTATION BEFORE THE OCCURRENCE OF A CONDITION IS GIVEN FOR HOURLY, UP TO 1 HOUR BEFORE THE CONDITION OCCURS | 85% |
| 3 | MODEL C | CHANGE POINT (TOOL CHANGE) | 63% |
| ... | ... | ... | ... |

ANALYSIS DEVICE

RELATED APPLICATIONS

The present application is a National Phase of International Application No. PCT/JP2021/025957 filed Jul. 9, 2021.

TECHNICAL FIELD

The present invention relates to an analysis device.

BACKGROUND ART

There are devices introduced to manufacturing sites in, such as, factories that monitor operation states of industrial machines, such as robots and machine tools, arranged in manufacturing lines to control the operation states of the industrial machines.

As a device for controlling an operation state of an industrial machine, for example, Patent Literature 1 discloses a device that acquires, during manufacturing a product, data about a normal state in which the product is manufactured normally and data about an abnormal state in which the manufactured product has an abnormality, and on the basis of the acquired data, determines relevance between the abnormality occurring in the manufactured product and the data to thereby select data usable for an abnormality prediction.

PRIOR ART DOCUMENT

Patent Literature

[Patent Literature 1] Japanese Patent Laid-Open Publication No. 2018-116545

SUMMARY OF THE INVENTION

Problems to be Solved by the Invention

At a manufacturing site, there is a demand to know what signs appear in data collected before an abnormality occurs. In order to find a sign appearing before an abnormality occurs, it is necessary to compare data collected in a normal state with data collected before the abnormality occurs (an alarm occurs) when data is collected, so as to find a sign appearing in the data before the abnormality occurs.

Such sign appearing in the data before the abnormality occurs may appear just before the occurrence of the abnormality, but may also appear a few days before. Thus, the comparison of the data about the normal state with the data before the abnormality occurs puts a heavy load on a user because the user has to determine which part of a huge amount of data should be compared. Furthermore, it is hard to find the sign in the data before the abnormality occurs by comparing such a huge amount of data. This task is necessary not only for analyses on the data about the normality/abnormality but also for analyses on signs appearing in data during occurrences of various events in the manufacturing site.

Thus, there is a need for technology that can support an analysis task to find a sign in data which is a sign of an event occurring in the manufacturing site.

Means for Solving the Problem

An operation data analysis device according to the present disclosure extracts feature amounts from operation data acquired from an industrial machine. The analysis device then displays a difference in the extracted feature amounts with a decision tree to support a data analysis task conducted by a user, so as to solve the above-described problem.

One aspect of the disclosure is an analysis device for supporting an analysis on data collected from an industrial machine, the analysis device including: a data acquisition unit that acquires the data detected in the industrial machine; an operation state extraction unit that extracts, from the data, pieces of data detected during the operation of the industrial machine; an annotation unit that creates a plurality of data set groups for a plurality of data sets cut out from the extracted data during the operation based on a predefined criterion, each data set group being given an annotation indicating an operation state of the industrial machine based on a predefined criterion; a feature amount extraction unit that extracts a feature amount for data included in each data set; a learning unit that creates a decision tree model for each of the plurality of data set groups by using the feature amount as an independent variable and the annotation indicating the operation state of the industrial machine as a dependent variable; and a display unit that ranks a plurality of the created decision tree models based on a correctness rate regarding a prediction of the annotation based on predetermined training data and displays the ranked decision tree models.

Effect of the Invention

One aspect of the present disclosure can visualize conditions as decision tree models, which are differences in states of an industrial machine (e.g., normal operation, before an abnormality occurs) when collected data is detected, and facilitates getting a grasp of a sign of a change in the state appearing in the data.

MODE FOR CARRYING THE INVENTION

Figure 1:
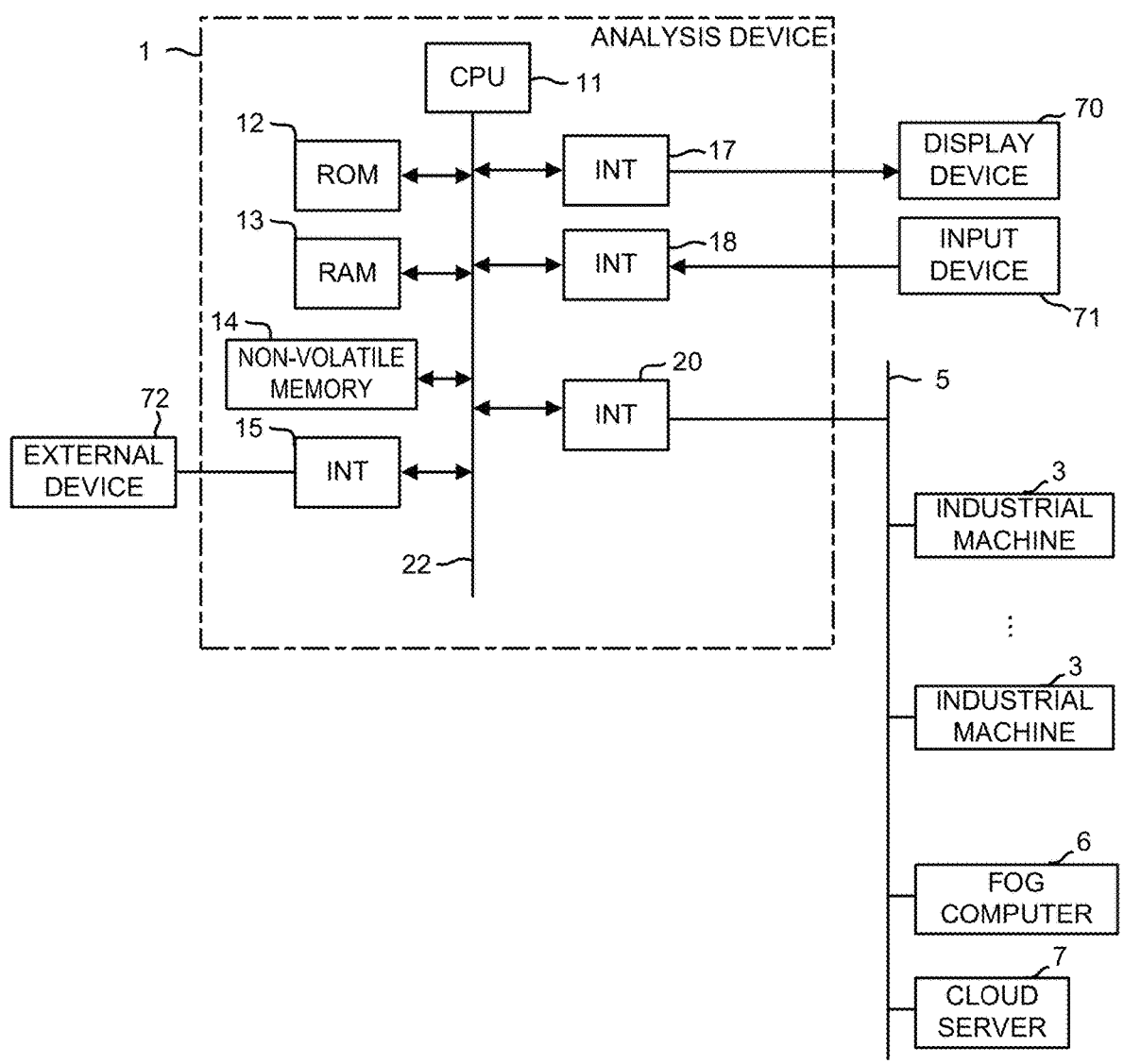
FIG. 1 is a schematic hardware configuration diagram of an analysis device according to an embodiment of the present invention.

An embodiment according to the present invention will now be described by referring to the drawings.

FIG. 1 is a schematic hardware configuration diagram showing a main part of an analysis device according to an embodiment of the present invention. An analysis device 1 of the invention can be mounted on a controller for controlling an industrial machine 3, by way of example. The analysis device 1 can also be mounted on a personal computer attached to the industrial machine 3, or can be mounted on a computer, such as a personal computer, a cell computer, a fog computer 6 or a cloud server 7, which is connected to the industrial machine 3 through a wired/wireless network. The illustrative embodiment shows an example of the analysis device 1 that is mounted on a personal computer connected to the industrial machine 3 through a network.

The analysis device 1 according to the embodiment includes a central processing unit (CPU) 11 that is a processor for controlling the analysis device 1 in its entirety. The CPU 11 reads a system program stored in a read only memory (ROM) 12 via a bus 22 to control the analysis device 1 in its entirety according to the system program. A random-access memory (RAM) 13 temporarily stores temporary computed data and display data, as well as various pieces of data input from outside.

A non-volatile memory 14 consists of a memory or a solid-state drive (SSD) which is backed up by a battery, not shown, for instance, and is for retaining memory even when a power source of the analysis device 1 is turned off. The non-volatile memory 14 stores pieces of data read from external device 72 via an interface 15, pieces of data input through an input device 71, pieces of data acquired from the industrial machine 3 and the like. The data stored in the non-volatile memory 14 may be loaded on the RAM 13 when the data is executed/used. Furthermore, various system programs, such as a known analysis program and similar, are written beforehand into the ROM 12.

The interface 15 is for connecting the CPU 11 of the analysis device 1 with the external device 72, such as a USB device. For example, from the external device 72, image data, such as prestored workpiece images, can be read. Furthermore, setting data edited in the analysis device 1 can be stored in external storage means via the external device 72, by way of example.

An interface 20 is for connecting the CPU 11 of the analysis device 1 with a wired or wireless network 5. To the network 5, the industrial machine 3, and the fog computer 6, the cloud server 7 or similar is connected to exchange data with the analysis device 1.

The industrial machine 3 includes a turning machine, an electrical discharge machine, a robot, a conveying machine and others, which are installed in a manufacturing site. The CPU 11 of the analysis device 1 acquires various data detected during a workpiece manufacturing operation by the industrial machine 3 via the network 5 or the external device 72, the various data being about current/voltage in a motor, position and speed of each operating part, a rate of acceleration, video and voice representing a processing state, temperatures of the surroundings of the machine and each machine component, a signal state of each component, a setting state of each component of the industrial machine 3, operation quality of the industrial machine 3 input by a worker, a result of processing a product, preparation information and others.

A display device 70 is for displaying each piece of data written in a memory, data resulting from the execution of a program and the like which are output via an interface 17. In addition to that, the input device 71 consisting of a keyboard, a pointing device and others transmits a command issued according to an operation by the worker, data and others to the CPU 11 via an interface 18.

Figure 2:
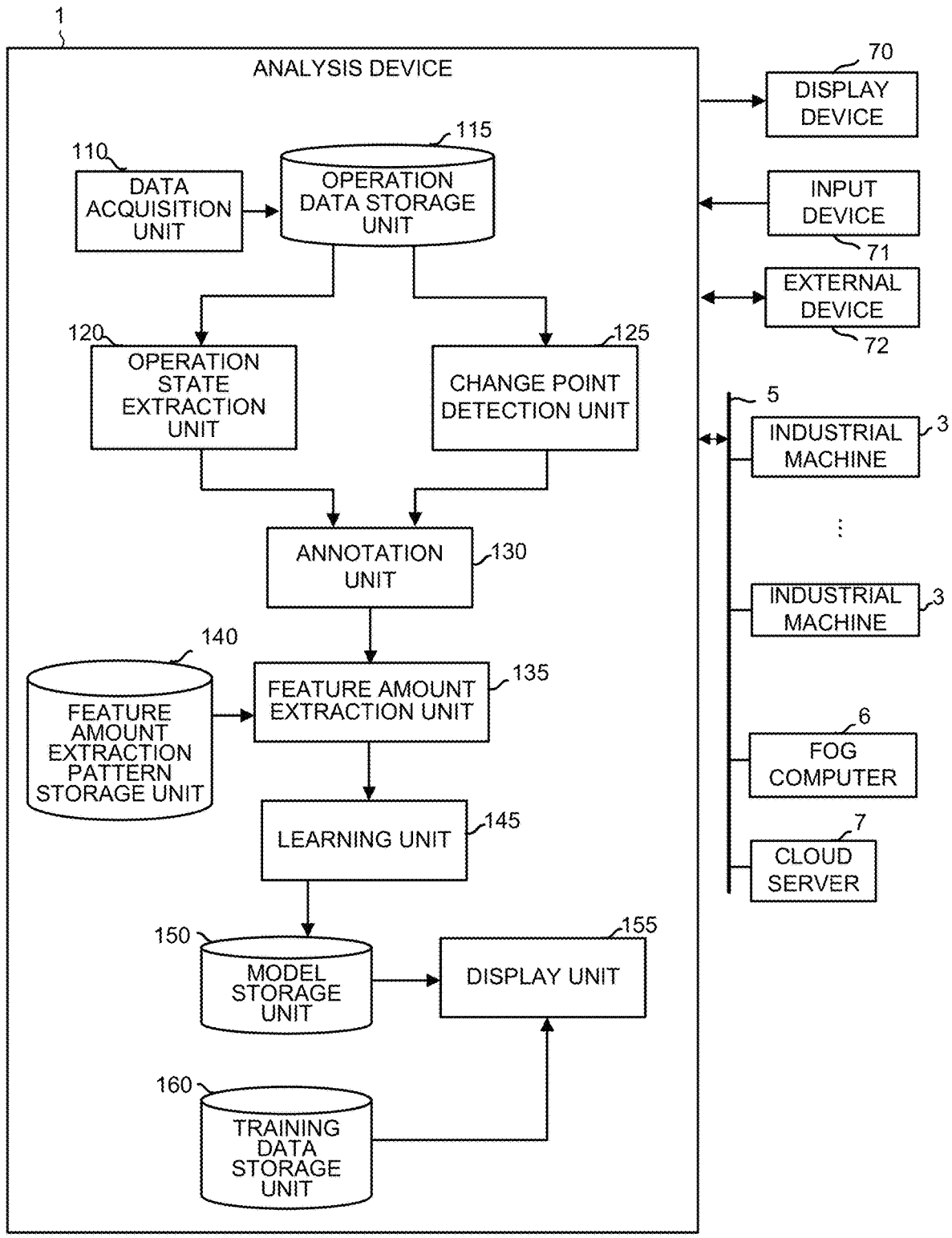
FIG. 2 is a block diagram showing schematic functions of the analysis device according to the embodiment of the present invention.

FIG. 2 is a schematic block diagram showing functions of the analysis device 1 according to an embodiment of the present invention. The functions of the analysis device 1 of this embodiment are implemented in such a way that the CPU 11 included in the analysis device 1 shown in FIG. 1 executes a system program to control the operation of each component of the analysis device 1.

The analysis device 1 of the illustrative embodiment includes a data acquisition unit 110, an operation state extraction unit 120, a change point detection unit 125, an annotation unit 130, a feature amount extraction unit 135, a learning unit 145 and a display unit 155. In addition to that, on the RAM 13 or the non-volatile memory 14 of the analysis device 1, prepared beforehand are an operation data storage unit 115 that is an area for storing data detected in the industrial machine 3, a feature amount extraction pattern storage unit 140 that is an area in which feature amount extraction patterns to be used for extracting a feature amount is stored in advance, a model storage unit 150 that is an area for storing a model created as a learning result, and a training data storage unit 160 that is an area for storing training data to be used for training the created model.

The data acquisition unit 110 is configured to acquire data detected in the industrial machine 3. The data detected in the industrial machine 3 includes, for example, data about current/voltage in a motor, position and speed of each operating part, a rate of acceleration, video and voice representing a processing state, temperatures of the surrounding of the machine and each machine component, a signal state of each component, a setting state of each component of the industrial machine 3, operation quality of the industrial machine 3 input by a worker, a result of processing a product, preparation information and others, which are detected during the operation of the industrial machine 3. The data acquisition unit 110 may acquire the data from the industrial machine 3 through the network 5, for instance. In addition to that, the data acquisition unit 110 may acquire prestored data detected in the industrial machine 3 from the external device 72. The data acquisition unit 110 stores the acquired data in the operation data storage unit 115.

The operation state extraction unit 120 is configured to extract signal data indicating whether the industrial machine 3 is in operation from the data which are detected in the industrial machine 3 and stored in the operation data storage unit 115 to thereby identify a portion of data detected during the operation of the industrial machine 3. In general, a signal indicating that the industrial machine 3 is in a predetermined operation is in an ON state when the industrial machine 3 is in operation. The operation state extraction unit 120 extracts date within the range where the concerned signal is ON as a set of data detected during the operation of the industrial machine 3.

The change point detection unit 125 is configured to detect a change point at which changes appear in trends in data movement in the data detected in the industrial machine 3 and stored in the operation data stored unit 115. As examples of the change point, there are a change point that can be extracted from data, such as a change in the processing program, a change of the tool and a change in an offset value, a change point that can be extracted from signal data, such as a rapid change in temperature and a decrease of torque of the motor of the industrial machine 3, and a change point relating to a task performed by a worker, such as a change in a preparation time and a change in a running time of the processing program. In many cases, there is no tendency that the detected data movements resemble one another before and after the change point. Thus, the change point detection unit 125 detects a change point as a criterion to make an analysis on the data. The analysis is usually made by using data groups detected between the change points in sets.

The annotation unit 130 is configured to make annotation on the data detected during the operation of the industrial machine 3 that is extracted by the operation state extraction unit 120 to thereby add an operation state of the industrial machine 3 when the concerned data is detected as an annotation. For example, the annotations indicating the operation state made by the annotation unit 130 may be "normal operation" and "before an abnormality occurs". Another example of the annotation indicating the operation state made by the annotation unit 130 may be "before a processing defect occurs", for instance, that is based on a description input by a worker with respect to an operation result of the industrial machine 3. Furthermore, a an detailed annotation concerning abnormality of the industrial machine 3, such as before the generation of an alarm about the tool or before the generation of an alarm about a spindle, may be made based on a detected alarm signal, or a detailed annotation concerning the processing defect, such as before occurrence of chipping in a workpiece or before the occurrence of immense amount of cutting surface roughness, may be made according to the specifics of the defect. These annotations may be made automatically according to the operation data, or a user may manually specify the annotations.

In a case where a prescribed event is detected, it cannot be known from the detected data as it is how long the data shows a sign of the event. Thus, the annotation unit 130 cuts out a data set for each operation, and creates a data set group with an annotation of "before the occurrence of the concerned event" for a date set for one operation, going back from a time when the prescribed event was detected, by way of example. In addition to that, the annotation unit 130 creates a data set group with an annotation of "before the occurrent of the concerned event" for data sets for two operations, going back from the time when the prescribed event was detected. Furthermore, the annotation unit 130 creates a data set group with an annotation of "before the occurrent of the concerned event" for data sets for three operations, going back from the time when the prescribed event was detected. In this way, the annotation unit 130 creates a predetermined given n-number of data set groups. The number of data set groups to be created is better to be configurable beforehand based on definitions made by the user. The range of cutting out the data set is not restricted to the cut out conducted based on the number of operations. For example, the cut out may be performed based on a time going back from the detection of the prescribed event, such as 30 minutes before, one hour before or the like. Moreover, the change point detected by the change point detection unit 125 may be utilized as a range of cutting out the data set. The range of the cut out of the data set may be set based on the definition made by the user.

Figures 3, 4:
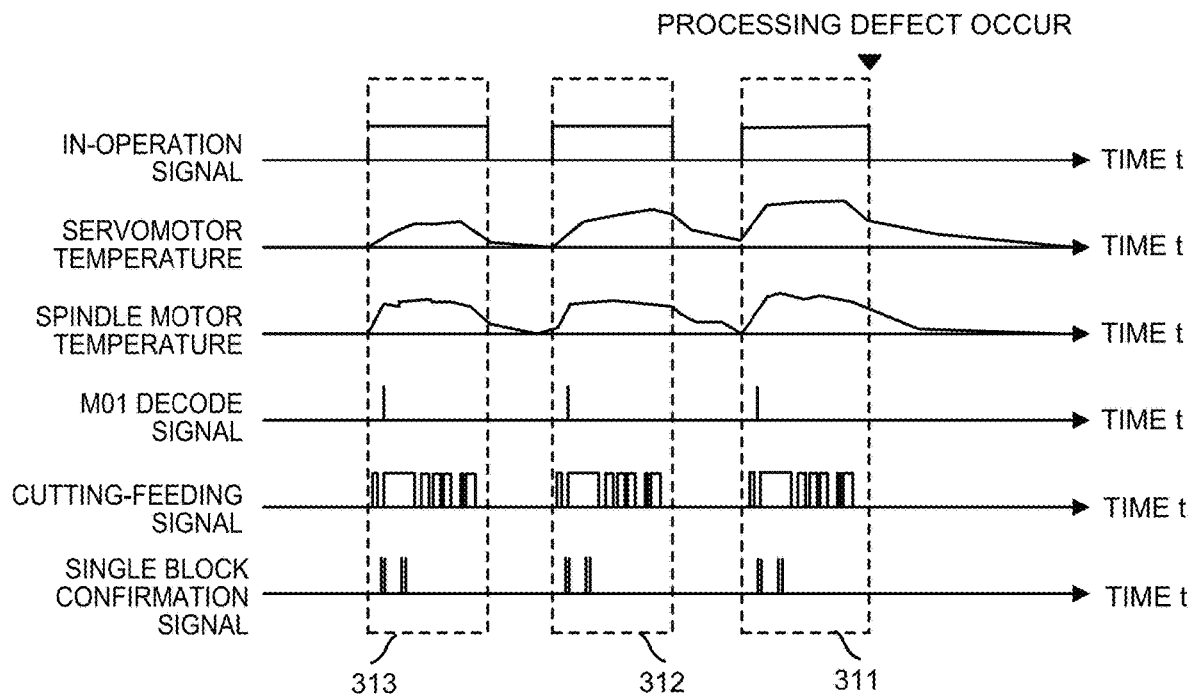
FIG. 3 illustrates how to cut out a data set and how to make an annotation indicating an operation state of an industrial machine.
FIG. 4 shows a display example performed by a display unit.

By referring to FIG. 3, a description will be made about operation examples of the operation state extraction unit 120 and the annotation unit 130. FIG. 3 shows an example of data detected from the industrial machine 3 when a processing defect is detected in a workpiece. In this example, a data set is cut out for a number of operations of the industrial machine 3. When the data illustrated in FIG. 3 is detected, the operation state extraction unit 120 refers to an in-operation signal included in the detected data to extract a data group in a section, in which the in-operation signal is ON, as a data set detected during the operation. In the example of FIG. 3, at least three data sets 311, 312 and 313 are extracted. Assuming that the worker makes a report that a processing defect occurred in a processed workpiece when the data set 311 among these data sets was detected. In this case, the annotation unit 130 makes an annotation of "before the processing defect occurs" on the data set 311 extracted by the operation state extraction unit 120 while making an annotation of "normal operation" on each of the data sets 312, 313, thereby creating a data set group with these data sets. In addition to that, the annotation unit 130 makes the annotation of "before the processing defect occurs" on each of the data sets 311, 312 extracted by the operation state extraction unit 120 while making the annotation of "normal operation" on the data set 313, thereby creating a date set group with these data sets. In this way, the annotation unit 130 creates a plurality of data set groups.

The feature amount extraction unit 135 extracts a predefined feature amount for each piece of data included in the annotated date sets. The predefined feature amount includes, for instance, the slopes of a mean value and a change, a variance value, a maximum variation, a value resulting from Fourier transformation, and a degree of abnormality. The feature amount extraction unit 135 may extract a plurality of feature amounts from a piece of data. A feature amount to be extracted in advance for each piece of data included in the data set is stored in the feature amount extraction pattern storage unit 140. The feature amount extraction unit 135 refers to the feature amount extraction pattern storage unit 140 to determine the feature amount to be extracted for each piece of data.

The learning unit 145 creates a decision tree model for each data set group created by the annotation unit 130, the decision tree model having the feature amount of each piece of data extracted by the feature amount extraction unit 135 as an independent variable and the annotation regarding the operation state of the industrial machine 3 made by the annotation unit 130 as a dependent variable. The learning unit 145 uses a decision tree learning algorism that may be known ID3, CART or C4.5, by way of example. A hyperparameter of a decision tree (e.g., depth of the tree, the number of nodes) may be set in advance. The algorisms for creating the decision tree model are well known, and thus a detailed description about creation processing will not be made in this specification. The decision tree models created by the learning unit 145 are stored in the model storage unit 150.

The display unit 155 evaluates the decision tree model created by the learning unit 145 by using training data and displays the result of the evaluation. The training data storage unit 160 may store, for instance, plural pieces of training data created beforehand by the user. In this case, the training data is given a proper annotation made on a predefined data set by the user. As training data, the above-described data set on which the annotation is made by the annotation unit 130 may be used. The display unit 155 uses each decision model created by the learning unit 145 to predict an annotation regarding the operation state of the industrial machine 3 for each piece of training data to be stored in the training data storage unit 160. The display unit 155 then computes a correctness rate of the decision tree model for the entire training data, assuming that the prediction is correct if the predicted annotation matches the annotation added to the training data and that the prediction is incorrect if the predicted annotation does not match. The display unit 155 in turn displays the result thus obtained as an evaluation result on the display device 70.

The display unit 155 may display on the display device 70 the correctness rate for each decision tree model created by the learning unit 145 together with a parameter such as how to cut out a date set. FIG. 4 shows a display example of the correctness rate for each model conducted by the display unit 155. As illustrated in FIG. 4, the display unit 155 provides a display that facilitates understanding of a correspondence relationship between an indication that facilitates understanding of how to cut out a date set and make an annotation for each model and the correctness rate obtained when the prediction is conducted on the training data. Such display facilitates immediate understanding about how to cut out the data and how to make an annotation to create a decision tree model that is closer to the correct prediction.

Figure 5:
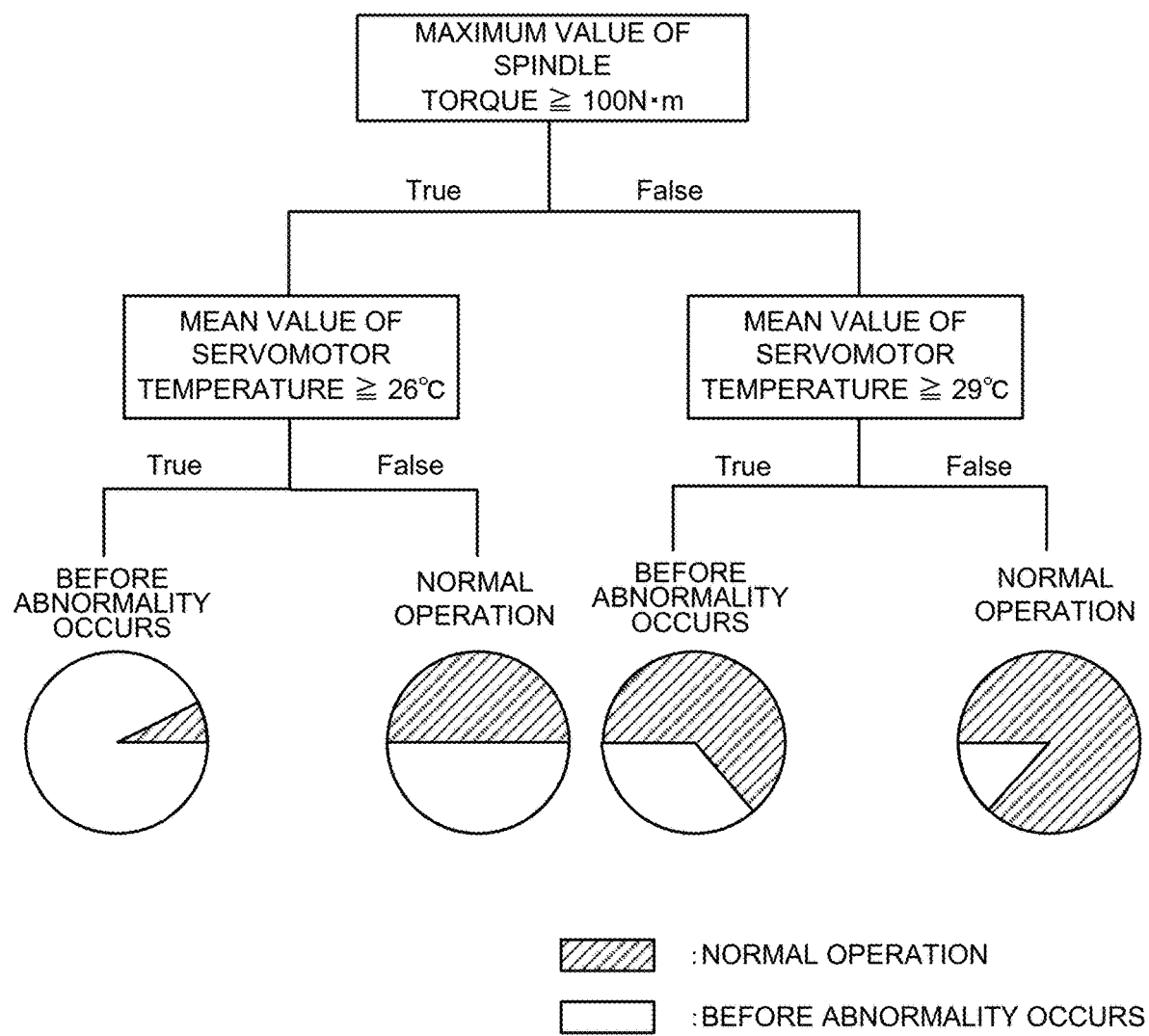
FIG. 5 shows another display example performed by the display unit.

In addition to that, the display unit 155 may display the details about the decision tree model and correctness rate as an evaluation result based on user specifications or automatically for a decision tree model with a high correctness rate. FIG. 5 shows a display example of a result of the evaluation made on the decision tree model by the display unit 155. Illustrated in FIG. 5 is a decision tree model created for a collection of data in which annotations of "normal operation" and "a state before the abnormality occurs" are added to each data set. The decision tree learning algorism uses the maximum value of spindle torque and a mean value of a servomotor temperature as independent variables that affect an evaluation result, and a determination is made on each independent variable to predict that each data set is either in the state of the normal operation or the state before the abnormality occurs. The display unit 155 predicts the state for prepared training data by using the above-described decision tree model. FIG. 5 shows the prediction results with pie charts. From the decision tree model shown in FIG. 5, it can be understood at a glance that the correctness rate is not good in a case where the maximum value of the spindle torque is less than 100 Nom and the servomotor temperature is 29° C. or more. Furthermore, it can be understood that the correctness rate is not good in a case where the maximum value of the spindle torque is 100 Nom or more and the means value of the servomotor temperature is lower than 26° C.

Furthermore, in a case where a node of the decision tree model is selected in the display shown in FIG. 5, a data set classified into this node may be displayed together. By arranging such displays in parallel, the user can easily understand a classification rule in each decision tree model.

In this way, the user refers to the decision tree model displayed by the display unit 155 and the prediction result about the training data to change the way of cutting out the data set and add/reduce the feature amount to be extracted which is stored in the feature amount extraction pattern storage unit 140. By repeating these processes, a decision tree model that makes more appropriate prediction for the training data can be obtained. The user can confirm how the annotation was made for the decision tree model that makes the appropriate prediction to thereby easily determine at what timing the sign of the state change appears.

The analysis device 1 having the above-described configuration according to the embodiment can visualize the data conditions that will be a sign of the change in the state of the industrial machine 3 (e.g., normal operation, before the abnormality occurs) as a decision tree model. The user can easily grasp the sign of the change in the state appearing in the data by referring to the decision tree model. Furthermore, the decision tree model created for each way of cutting out the data set is visualized, so that it is possible to determine when the sign of the change in the state appears in each piece of data.

The embodiment of the present invention has been described as above, but the invention is not limited to the above examples. Thus, the present invention can be implemented in various modes by modifying the invention in appropriate ways.

REFERENCE SIGNS LIST

1 Analysis Device
3 Industrial Machine
5 Network
6 Fog Computer
7 Cloud Server
11 CPU
12 ROM
13 RAM
14 Non-volatile Memory
15, 17, 18, 20 Interface
22 Bus
70 Display Device
71 Input Device
72 External Device
110 Data Acquisition Unit
115 Operation Data Storage Unit
120 Operation State Extraction Unit
125 Change Point Detection Unit
130 Annotation Unit
135 Feature Amount Extraction Unit
140 Feature Amount Extraction Pattern Storage Unit
145 Learning Unit
150 Model Storage Unit
155 Display Unit
160 Training Data Storage Unit
311 to 313 Data Set

The invention claimed is:

1. An analysis device for supporting an analysis of data collected from an industrial machine, the analysis device comprising:
 a processor configured to:
 acquire the data from the industrial machine;
 extract, from the data, pieces of data detected during an operation of the industrial machine;
 create a plurality of data set groups for a plurality of data sets cut out from the extracted data during the operation on a basis of a predefined criterion, each data set group being given an annotation indicating an operation state of the industrial machine on the basis of the predefined criterion;
 extract a feature amount for data included in each data set;
 create a decision tree model for each of the plurality of data set groups by using the feature amount as an independent variable and the annotation indicating the operation state of the industrial machine as a dependent variable; and
 rank a plurality of the created decision tree models on a basis of a correctness rate regarding a prediction of the annotation based on predetermined training data and display the ranked decision tree models.

2. The analysis device according to claim 1, wherein the predefined criterion for cutting out the data set from the extracted data during the operation is a number of operations or an operation time of the industrial machine.

3. The analysis device according to claim 1, wherein the processor is configured to detect a change point of the operation of the industrial machine from the data acquired by the processor,
 wherein the predefined criterion for cutting out the data set from the extracted data during the operation is the change point detected by the processor.

4. The analysis device according to claim 1, wherein each of the plurality of data set groups is given an annotation at different timing that indicates that the operation state of the industrial machine has changed.

5. The analysis device according to claim 1, wherein the processor is configured to display the decision tree model and the correctness rate based on the predetermined training data for each terminal node of the decision tree model.

6. The analysis device according to claim 1, wherein the processor is configured to, in response to a terminal node of the decision tree model being selected, display training data that is classified into the selected terminal node.

\* \* \* \* \*